(12) United States Patent
Hankins et al.

(10) Patent No.: US 6,948,805 B2
(45) Date of Patent: Sep. 27, 2005

(54) INK CARTRIDGE RESERVOIR

(75) Inventors: James Hankins, Corvallis, OR (US);
Daniel W. Petersen, Philomath, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/426,151

(22) Filed: Apr. 29, 2003

(65) Prior Publication Data

US 2004/0218024 A1 Nov. 4, 2004

(51) Int. Cl.⁷ .............................................. B41J 2/175
(52) U.S. Cl. ........................................................ 347/86
(58) Field of Search ................. 347/86, 87; 219/121.69; 401/16

(56) References Cited

U.S. PATENT DOCUMENTS

| | | | |
|---|---|---|---|
| 3,909,582 A | * | 9/1975 | Bowen .................. 219/121.69 |
| 4,460,534 A | | 7/1984 | Boehm et al. |
| 5,279,693 A | | 1/1994 | Robinson et al. |
| 5,893,959 A | | 4/1999 | Muellich |
| 6,012,795 A | | 1/2000 | Saito |
| 6,110,576 A | | 8/2000 | Decker et al. |
| 6,161,927 A | | 12/2000 | Long |
| 6,347,865 B1 | * | 2/2002 | Matsumoto et al. .......... 347/86 |
| 6,425,702 B1 | * | 7/2002 | Brunetti ...................... 401/16 |
| 6,498,311 B1 | | 12/2002 | Stewart et al. |
| 2001/0035895 A1 | | 11/2001 | Miyazaki |

FOREIGN PATENT DOCUMENTS

| | | |
|---|---|---|
| EP | 0 483 569 | 5/1992 |
| EP | 0864428 | 9/1998 |
| EP | 1 029 650 | 8/2000 |
| GB | 2 276 584 | 10/1994 |

OTHER PUBLICATIONS

"Two–Shot Molding of Thermoplastic Elastomers", R.J. Digiantonio, Society of Plastics Engineers ANTEC '92, Detroit, Michigan, May 1992.

"Injection Moulding Technologies of Weidmann", Weidmann Plastics Technology AG, 1998, webpage (www.weidmann–plastics.com/0400.htm).

"Two–Shot Injection Molding Expanding Array of Structural Plastics", Machine Design, May 11, 2002, webpage (www.jobwerx.com/news/Archives/Two–shot.html).

* cited by examiner

*Primary Examiner*—Anh T. N. Vo

(57) ABSTRACT

A first reservoir member of an ink cartridge reservoir, the first reservoir member including a first portion formed of a thermoplastic that is one of absorbent of and transparent to radiant thermal energy, and configured to be welded to a second reservoir member, and a second portion formed of a thermoplastic having a characteristic different than the first portion.

56 Claims, 3 Drawing Sheets

INK CARTRIDGE RESERVOIR

BACKGROUND

The present invention relates generally to ink cartridges for print devices, and more particularly, to reservoirs contained in such ink cartridges. Ink cartridges are used in many print devices, such as printers and facsimile machines. Typically, ink cartridges contain an ink reservoir or multiple ink reservoirs. Each reservoir may retain the ink in a capillary material such as foam, or the reservoir may contain "free ink" (ink which is not retained in a capillary material). The ink contained within these reservoirs is intended to pass through a print head to media during printing.

Color printing may involve printing with one or more inks of different colors. As a result of repeated printing, the ink cartridges may become depleted, and inks of different colors may become depleted at different times. It therefore becomes necessary to replace the ink cartridge or cartridges from time to time. In order to allow printing using a selected color or colors, a cartridge containing a supply of ink of the desired color or colors may be used to replace a cartridge that has become depleted. The color of ink contained in a new cartridge may be imprinted on a package containing the cartridge. Once the cartridge is removed from a package, it is helpful to have the color of the ink contained in a cartridge identified directly on the cartridge. This is helpful during both installation of a new cartridge, as well as replacement of an existing cartridge. The reservoir portion of a cartridge may be formed of two members, such as a body and a lid, which are then joined together.

SUMMARY

Embodiments of a first reservoir member of an ink cartridge reservoir are disclosed, the first reservoir member including a first portion formed of a thermoplastic that is one of absorbent of and transparent to radiant thermal energy, and configured to be welded to a second reservoir member, and a second portion formed of a thermoplastic having a characteristic different than the first portion.

DETAILED DESCRIPTION

Figure 1:
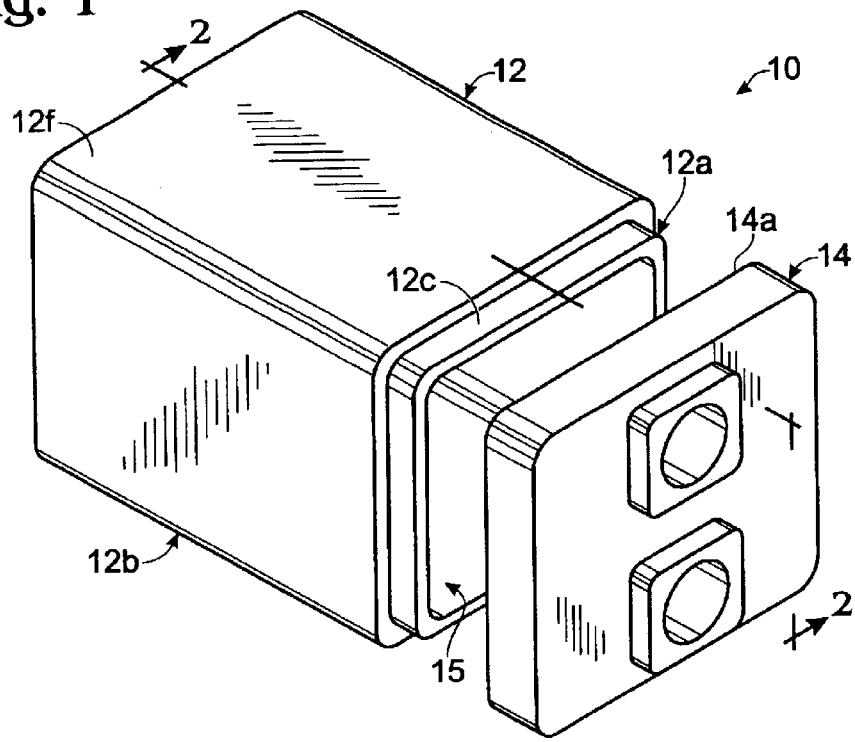
FIG. 1 is an isometric exploded view of a reservoir for a print-device ink cartridge according to an embodiment of one aspect of the present invention.
Figure 2:
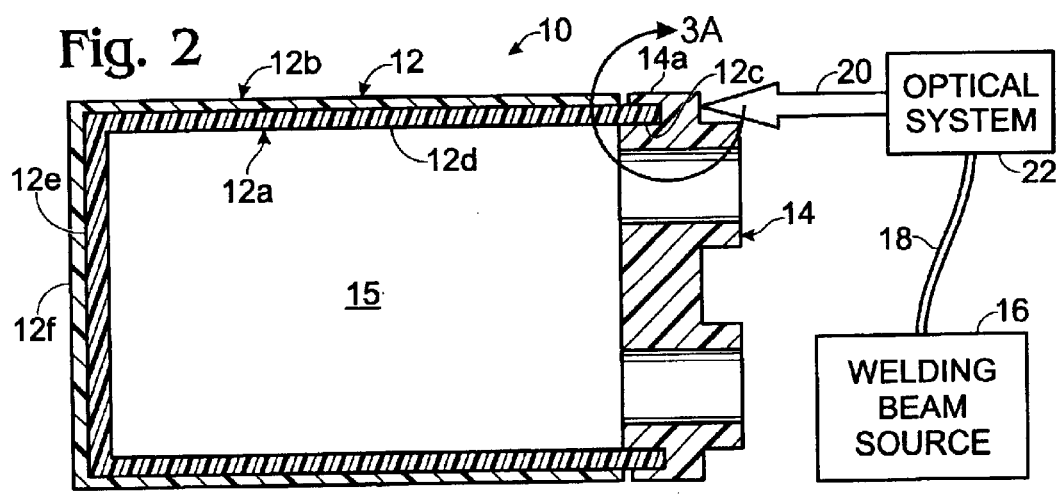
FIG. 2 is a cross section taken along line 2—2 of the reservoir of FIG. 1 illustrating welding of first and second reservoir members.

Referring initially to FIGS. 1–3, a reservoir of a print-device ink cartridge is shown generally at 10. Reservoir 10 may include a reservoir body 12, also referred to as a first reservoir member, and a lid 14, also referred to as a second reservoir member. Although these reservoir members are shown as a body that forms a chamber 15 and a lid that covers one end of the chamber, other shapes and forms of the body members may be provided so long as they form a reservoir when combined. Further, it will be noted that although a reservoir with a single chamber for containing ink of a single color is illustrated, a reservoir may be formed that includes a plurality of chambers, whether for containing ink of a single color, or of inks of different colors. Each ink chamber may be filled with a permeable material, such as foam, or any other porous material that may absorb ink (not shown), or each ink chamber may contain "free ink". Ink-permeable foam in each chamber nominally may be soaked with ink of a color.

Body 12 may include an inner portion 12a and an outer portion 12b. Inner portion 12a may be formed of a first thermoplastic that may be absorbent of radiant thermal energy, such as laser energy. A thermoplastic such as polypropylene may have a substance, such as black colorant or other particles, added that may make it thermal-energy absorbent. Referring particularly to FIG. 2, inner body portion 12a may have a projecting lip 12c, an inner surface 12d that may define an interior of body 12, and an outer surface 12e. Outer portion 12b of the body may cover and be integrally joined to the outer surface 12e of the inner portion, leaving lip 12c exposed. Outer portion 12b may have an exterior surface 12f forming an exterior surface of body 12. The outer portion may be made of a second thermoplastic, such as polypropylene, with different properties than the first thermoplastic. For instance, the second thermoplastic may be of a form that is more readily recycled, transparent when the first thermoplastic is opaque, or contain metal, color or other particles to give it a distinctive visual appearance. For instance, a color pigment may be added to give it a visually perceived color, such as magenta, cyan, yellow or gray, that is indicative of the given color of ink, such as magenta, cyan, yellow or black, respectively, to be contained in the reservoir.

Figure 3A:
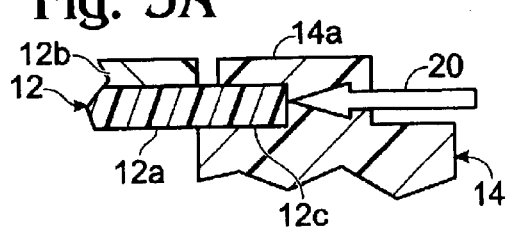
FIG. 3A is an enlarged cross section of a portion of the reservoir of FIG. 2.
Figure 3B:
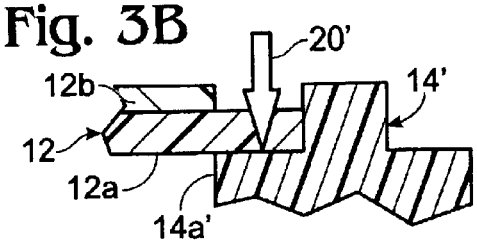
FIG. 3B is a cross section like FIG. 3A for an alternative embodiment.

Lid 14 may have a rim 14a that seats matingly against a corresponding surface of lip 12c, as shown in FIGS. 2 and 3A. Rim 14a and lip 12c, accordingly, may be considered to be joint surface regions. Lid 14, and in particular, rim 14a may be made of a thermoplastic, such as polypropylene, that is transparent to radiant thermal energy. Rim 14a, may be made transparent to radiant thermal energy and the other portion of the lid may be made to have a different characteristic, such as a color representative of the color of ink. For instance, the color gray may represent black ink. Alternatively, the entire lid may be made to be radiant-thermal-energy transparent.

An example of welding lid 14 to body 12 is illustrated in FIG. 2. A welding beam source 16 may direct a radiant thermal beam, such as a laser beam, along a beam waveguide 18, such as an optical fiber or other suitable element. A welding beam 20 may be directed by an optical system 22 through rim 14a to impinge lip 12c. The thermal beam may heat lip 12c sufficiently to melt it and rim 14a in the regions adjacent to the contacting surfaces. The beam may be directed around the rim until the rim and lip are continuously joined. The rim and lip thereby form an integral connection sealingly attaching the lid to the body.

Alternatively, rim 14a may be made of a thermal-energy-absorbent thermoplastic and lip 12c may be made of a thermal-energy-transparent thermoplastic. In this case, a rim 14a' may be configured to fit within lip 12c, as is illustrated by a lip 12c' shown in FIG. 3B, with welding provided by a beam 20' directed through the lip to impinge the rim.

Figure 4:
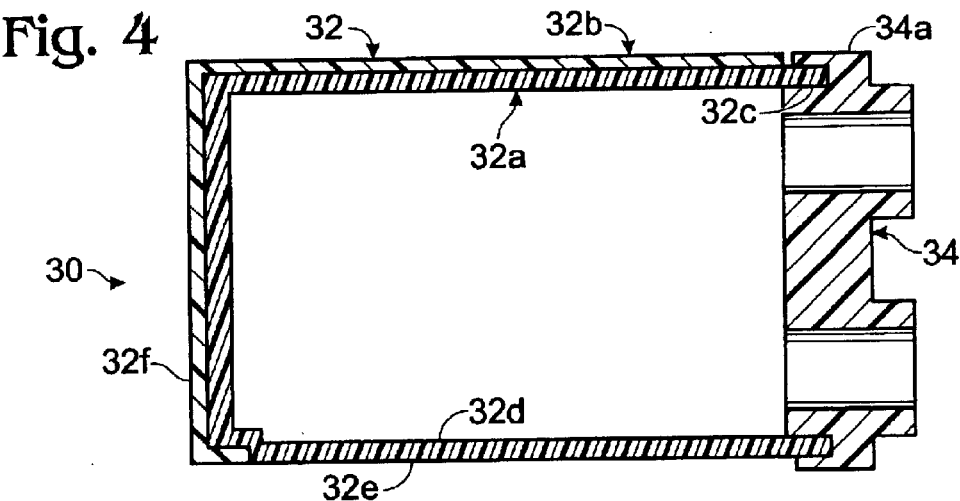
FIG. 4 is a cross section of a second embodiment according to another aspect of the invention.

FIG. 4 illustrates a second embodiment of a reservoir 30 including a body 32 and a lid 34 having a rim 34a. As with body 12, body 32 may include an inner portion 32a and an outer portion 32b. Inner portion 32a may also be formed of a thermoplastic having characteristics as described above for inner portion 12a. The Inner portion 32a may have a projecting lip 32c, an inner surface 32d that may define an interior of body 32, and an outer surface 32e. Outer portion 32b of the body may cover and be integrally joined to a portion of the outer surface 32e of the inner portion, leaving lip 32c exposed. Accordingly, outer portion 32b may have an exterior surface 32f forming a portion of an exterior surface of body 32. A portion of outer surface 32e of the inner portion also may form a portion of an exterior surface of body 32. As was described for outer portion 12b, outer portion 32b may also be made of a thermoplastic compatible with the thermoplastic that inner portion 32a is made from. Outer portion 32b further may have a color pigment added to give it a visually perceived color that is related to the color of ink to be contained in the reservoir.

Figure 5:
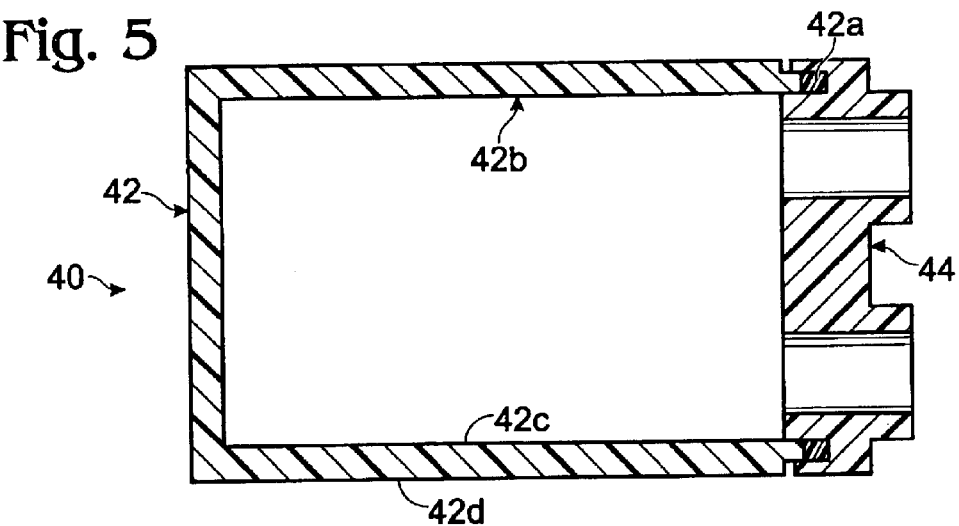
FIG. 5 is a cross section of a third embodiment according to a further aspect of the invention.

FIG. 5 illustrates yet a third embodiment of a reservoir 40 including a body 42 and a lid 44. Body 42 may include a lip portion 42a and a main portion 42b. Lip portion 42a may be formed of a thermoplastic having characteristics as described above for inner portion 12a, and may correspond in configuration to lip 12c. Main portion 42b of the body forms the main reservoir, with a reservoir interior surface 42c and an exterior surface 42d. This results in a reservoir body that is the color representing the ink color. The lip portion then may have a different color or appearance when it is formed with a thermoplastic that is complementary to the lid and may be either radiant-thermal-energy absorbent or transparent, as has been described. Lid 44, accordingly, may be similar in all characteristics to lid 14.

Figure 6A:
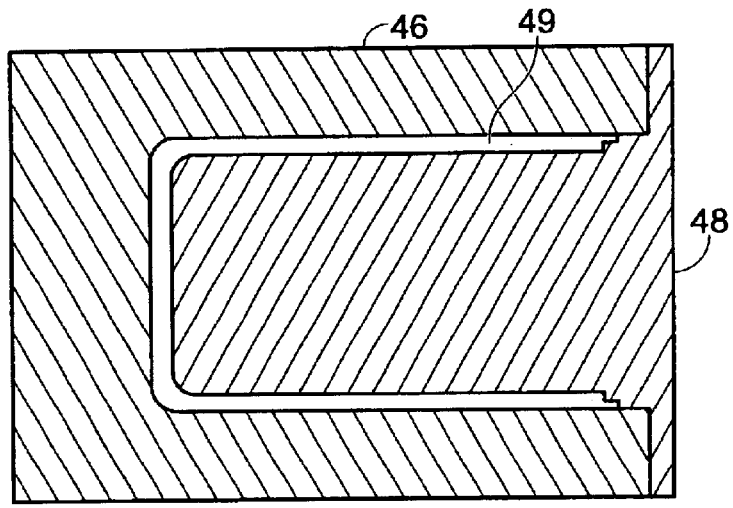
FIGS. 6A, 6B and 6C illustrate making a first reservoir member according to another aspect of the invention.
Figure 6B:
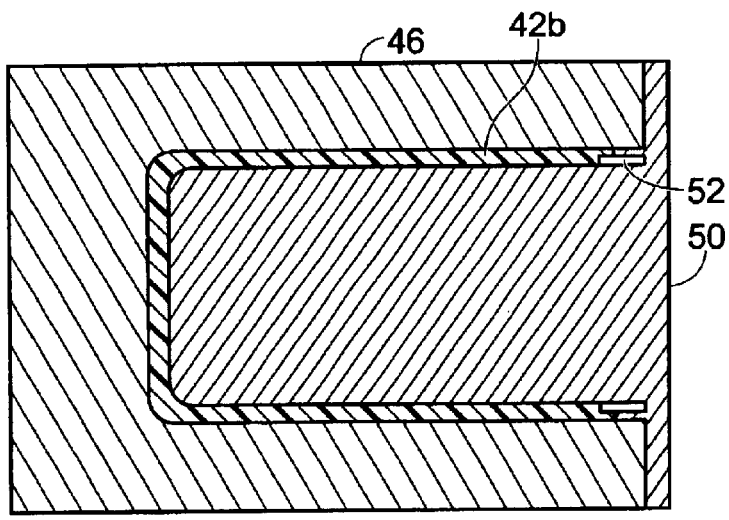
Figure 6C:
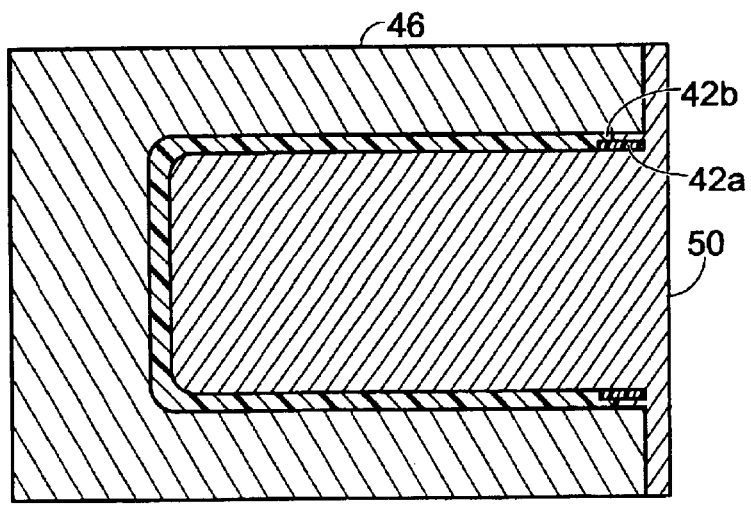

FIGS. 6A, 6B and 6C schematically illustrate a method of making the bodies described in the above reservoir embodiments. In particular, the formation of body 42 is illustrated. A multiple-shot molding technique may be employed. A first shot may form main portion 42b. A first mold form 46 may be provided for defining exterior surface 42d. A second mold form 48 may be inserted into first mold form 46 for defining interior surface 42c. Mold forms 46 and 48 are shown in position in FIG. 6A prior to the initial injection. Molten injection molding material may then be injected into the resultant cavity 49.

Second mold form 48 may then be retracted from within the newly formed body main portion 42b. A third mold form 50 may be inserted into the newly formed body main portion, leaving a cavity 52 as shown in FIG. 6B. A second molten injection molding material may then be injected into cavity 52 to form lip portion 42a. The lip portion may be formed against a shoulder of the main portion so that the two are integrally joined together, forming a unitary body 42, as shown in FIG. 6C.

A similar method may be used to form inner portions 12a and 30a, and outer portions 12b and 30b in the previous two embodiments. Further, the lip or inner portion may be formed first and the main or outer portion may be formed second. In each case, the portion formed first may act as a portion of the mold form for the second portion to be formed. The reservoir members may also be formed as a combination of additional portions formed by additional molding steps, such as using three-shot molding. Additional shots may be appropriate, for instance when a reservoir has multiple chambers for storing differently colored inks and it is desired to form the reservoir with differently colored portions. Otherwise, parts may be stamped or otherwise formed from softened materials that harden in such a manner that one of the layers forms a mold form for the next layer. Similar methods may be used to form a lid have similar characteristics to the reservoir bodies described above.

Various materials may be used to form the reservoir members. The materials may be selected to be compatible for multi-shot injection molding, as well as the subsequent radiant-thermal-energy welding of the members. Various thermoplastics, such as polypropylene, may be used.

Figure 7:
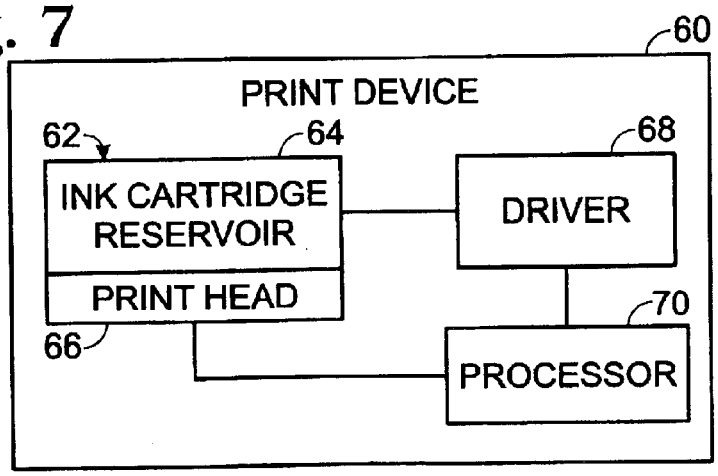
FIG. 7 is a block diagram illustrating a print device according to the invention.

Referring now to FIG. 7, a print device is generally indicated at 60. Print device 60 is representative of any suitable type of print device that employs an ink cartridge, such as a facsimile machine, computer or processor printer or document copier. As indicated, print device 60 may include an ink cartridge 62 that may be supported on a carriage configured to pass across print media as the media is drawn through the print device. Media may be fed through print device 60 using any suitable feeder such that the media passes under the ink cartridge. Ink cartridge 62 may include a reservoir 64, such as reservoirs 10 and 40 described above, or a reservoir having reservoir members such as reservoir body 30. A print head 66 may be in fluid communication with reservoir 64, and may include ink channels and ink ejection chambers that control the regulated release of ink onto print media during printing. The print head may or may not be fixed to the reservoir. A plurality of contact pads may be electrically aligned with contacts on the carriage when the print cartridge is installed to accommodate communication of operating instructions to the ink cartridge. An ink cartridge driver 68 may move the ink-cartridge carriage across the print media. The print head and driver are responsive to signals received from a print processor 70 to deposit ink onto print media as the media passes below the print cartridge.

When some colorants corresponding to ink colors are added to polypropylene, laser energy entering the polypropylene may be dispersed. This may prevent the laser energy from either being transmitted, as is provided by laser-energy transparent polypropylene, sufficiently to provide welding, or from being absorbed sufficiently to provide welding, as is provided by laser-energy-absorbent polypropylene. Accordingly, an ink-colored reservoir may not be as effectively used for laser welding a lid to a body as thermoplastics that are not ink colored. The reservoirs and reservoir members described above may be laser welded, and also may have a portion with a desired different characteristic, such as a color representing a color of ink contained or to be contained in the ink cartridge reservoir. Depending on the colors of colorants used, a thermoplastic may be laser energy absorbent or transparent as well.

While the present disclosure has been provided with reference to the foregoing embodiments, those skilled in the art will understand that many variations may be made therein without departing from the spirit and scope defined in the following claims. Therefore, the foregoing embodiments are illustrative, and no single feature, procedure or element is essential to all possible combinations that may be claimed in this or a later application. Moreover, the description should be understood to include all novel and non-obvious combinations of elements described herein, and claims may be presented in this or a later application to any novel and non-obvious combination of these elements. Where the claims recite "a" or "another" element or the equivalent thereof, such claims should be understood to include incorporation of one or more such elements, neither requiring nor excluding two or more such elements.

What is claimed:

1. A first reservoir member of an ink cartridge reservoir, the first reservoir member comprising:
   a first portion molded of a thermoplastic that is one absorbent of and transparent to radiant thermal energy, and configured to be welded to a second reservoir member that is the other absorbent of and transparent to radiant thermal energy; and
   a second portion molded integrally with the first portion, the second portion being formed of a thermoplastic having a characteristic different than the first portion.

2. The first reservoir member of claim 1, where the second portion forms at least a part of an exterior surface of the reservoir.

3. The first reservoir member of claim 2, where the first portion forms a part of an interior surface of the reservoir.

4. The first reservoir member of claim 3, where the second portion forms an exterior surface of the reservoir over at least a part of the first portion.

5. The first reservoir member of claim 1, where the second portion has a color, other than black, indicative of a given color of ink of the ink cartridge reservoir.

6. The first reservoir member of claim 5, where the second portion forms a part of an exterior surface of the reservoir.

7. The first reservoir member of claim 1, where the first portion and second portion are multiple-shot injection molded.

8. The first reservoir member of claim 1, where the first reservoir member forms an incomplete part of an internal surface of the reservoir.

9. A reservoir of an ink cartridge of a print device, the reservoir comprising:
   a first reservoir member including a first portion molded of a first thermoplastic, and a second portion molded integrally with the first portion, the second portion being formed of a second thermoplastic having a characteristic different than the first thermoplastic; and
   a second reservoir member formed of a thermoplastic welded to the first portion;
   the first and second reservoir members forming a storage chamber for ink.

10. The reservoir of claim 9, where the first portion extends only along a joint between the first and second reservoir members.

11. The reservoir of claim 9, where the first portion is configured to absorb laser energy adjacent to a joint between the first and second reservoir members.

12. The reservoir of claim 11, where the first portion is configured to absorb laser energy only adjacent to the joint.

13. The reservoir of claim 9, where the second portion forms a part of an exterior surface of the reservoir.

14. The reservoir of claim 13, where the first portion forms a part of an interior surface of the reservoir.

15. The reservoir of claim 14, where the second portion forms an exterior surface of the reservoir on at least a part of the first portion.

16. The reservoir of claim 9, where the first portion is substantially transparent to laser energy generated by a laser welder.

17. The reservoir of claim 9, where the characteristic of the second portion is color and the second portion has a color, other than black, indicative of a given color of ink of the print cartridge.

18. The reservoir of claim 17, where the second portion forms a part of an exterior surface of the reservoir.

19. The reservoir of claim 9, where the first portion and second portion are multiple-shot injection molded.

20. The reservoir of claim 9, where the first reservoir member has an internal surface forming a first part of an internal surface of the reservoir, and the second reservoir member has an internal surface forming a second part of the internal surface of the reservoir.

21. A print device comprising:
   a print head configured to eject ink; and
   a reservoir fluidically coupled to the print head and configured to contain a supply of ink of a given color, the reservoir including
      a first member integrally molded of a thermoplastic and including a first portion and a second portion, the second portion visually distinct from the first portion and having a color, other than black, indicative of the given color; and
      a second member formed of a thermoplastic and including a third portion welded to the first portion.

22. The print device of claim 21, where the second portion covers the first member other than in the first portion.

23. The print device of claim 21, where the first portion absorbs laser energy.

24. The print device of claim 23, where only the first portion of the first member absorbs laser energy.

25. The print device claim 23, where the third portion is transparent to laser enemy generated by a laser welder.

26. The print device of claim 21, where the second portion forms a part of an exterior surface of the reservoir.

27. The print device of claim 26, where the first portion forms a part of an interior surface of the reservoir.

28. The print device of claim 27, where the second portion forms an exterior surface of the reservoir on at least a part of the first portion.

29. The print device of claim 21, where the first portion is substantially transparent to laser energy.

30. The first reservoir member of claim 21, where the first portion and second portion are multiple-shot injection molded.

31. The first reservoir member of claim 21, where the first member has an internal surface forming a first part of an internal surface of the reservoir, and the second member has an internal surface forming a second part of the internal surface of the reservoir.

32. A reservoir configured to couple to a print head and to contain a supply of ink of a given color for supply of the print head, the reservoir comprising:
   a first reservoir member integrally molded of a thermoplastic, forming a first part of an interior surface of the reservoir, and including a first portion that absorbs laser energy, and a second portion integrally molded with and visually distinct from the first portion, the second portion covering the exterior of at least a part of the reservoir, and having a color related to the given color; and
   a second reservoir member formed of a thermoplastic and including a third portion transparent to laser energy, the third portion being welded to the first portion.

33. A print device comprising:
   a print head configured to eject ink; and
   a reservoir fluidically coupled to the print head and configured to contain a supply of ink of a given color, the reservoir including:
      a first member integrally molded of a thermoplastic and including a first portion and at least a second portion having a color visually distinct from the first portion and related to the given color; and a second member formed of a thermoplastic and including a third portion welded to the first portion;

a print driver configured to move the reservoir; and a processor configured to operate the print driver and the print head.

34. A print device comprising:

means for ejecting ink; and means for supplying ink of a given color to the means for ejecting ink, the means for supplying ink including a first member integrally molded of a thermoplastic, with a first portion and a second portion integrally molded with and visually distinct from the first portion, the second portion having a color related to the given color, and a second member formed of a thermoplastic and welded to the first portion.

35. The ink cartridge of claim 34, where one of the first portion and at least a part of the second member is configured for absorbing laser energy, and the other of the first portion and the at least a portion of the second member is configured for transmitting laser energy.

36. The ink cartridge of claim 34, where the second portion is configured to form an exterior surface on at least a portion of the first portion.

37. A method of making a first reservoir member of an ink cartridge reservoir in a print device, the method comprising:

molding a first portion using a first thermoplastic that is one of substantially absorbent and substantially transparent to radiant thermal energy, and configured to be welded along a joint surface region to a second reservoir member; and integrally molding a second portion with the first portion using a second thermoplastic with a visual characteristic different than a visual characteristic of the first thermoplastic;

where forming the first portion and forming the second portion include forming the first and second portions to be configured to form an incomplete part of an internal surface of the reservoir.

38. The method of claim 37, where molding a first portion includes molding a first portion that is absorbent of radiant thermal energy generated by a laser welder.

39. The method of claim 38, where molding a first portion consists of forming a first portion along only the first joint surface region.

40. The method of claim 39, where molding a first portion includes shooting one shot of a multiple-shot injection molding process, and molding a second portion includes shooting another shot of a multiple-shot injection molding process.

41. The method of claim 39, where molding a second portion includes molding a second portion defining at least a part of an exterior surface of the first reservoir member.

42. The method of claim 41, where molding a first portion includes molding a first portion defining at least a part of an interior surface of the first reservoir member.

43. The method of claim 42, where molding a second portion includes molding a second portion on the exterior surface of at least a part of the first portion.

44. The method of claim 39, where molding a second portion includes molding a second portion having an externally exposed surface region having a color, other than black, indicative of a color of ink to be held in the ink cartridge reservoir.

45. The method of claim 37, where molding a first portion and molding a second portion include multiple-shot injection molding the first and second portions.

46. A method of making an ink cartridge reservoir comprising:

molding a first member having first and second portions, the first portion being of a first thermoplastic that is one of substantially absorbent of laser energy and substantially transparent to laser energy and having a first joint surface region, the second portion being of a second thermoplastic having a visual characteristic that is different than a visual characteristic of the first thermoplastic;

forming a second member formed of a thermoplastic and having a second joint surface region that is the other of substantially absorbent of laser energy and substantially transparent to laser energy; and applying laser energy appropriate to weld the first joint surface region to the second member joint surface region.

47. The method of claim 46, where molding a first member includes molding a first portion consisting of the first joint surface region.

48. The method of claim 46, where molding a first member includes molding a second region with a color, other than black, indicative of a given color of ink to be held in the ink cartridge reservoir.

49. The method of claim 48, further comprising putting ink of the given color in the reservoir.

50. The method of claim 48, where forming a first region includes forming a first region with a color different than the color of the second region.

51. The method of claim 46, where forming a joint surface region includes forming a joint surface region that is transparent to radiant thermal enemy in the form of laser energy.

52. The method of claim 46, where molding a first portion includes molding a second portion forming at least a portion of an exterior surface of the reservoir.

53. The method of claim 46, where molding a first member includes molding a first portion forming at least a portion of an interior surface of the reservoir.

54. The method of claim 53, where molding a first member includes molding a second portion forming an exterior surface of at least a part of the first member.

55. The method of claim 46, where molding a first member includes multiple-shot injection molding the first and second portions.

56. The method of claim 46, where molding a first member includes molding a first member with an internal surface forming a first part of an internal surface of the reservoir, and molding a second member includes molding a second member with an internal surface forming a second part of the internal surface of the reservoir.

* * * * *